J. S. HALL.
Shovel-Plow.
No. 10,505
Patented Feb. 7, 1854.
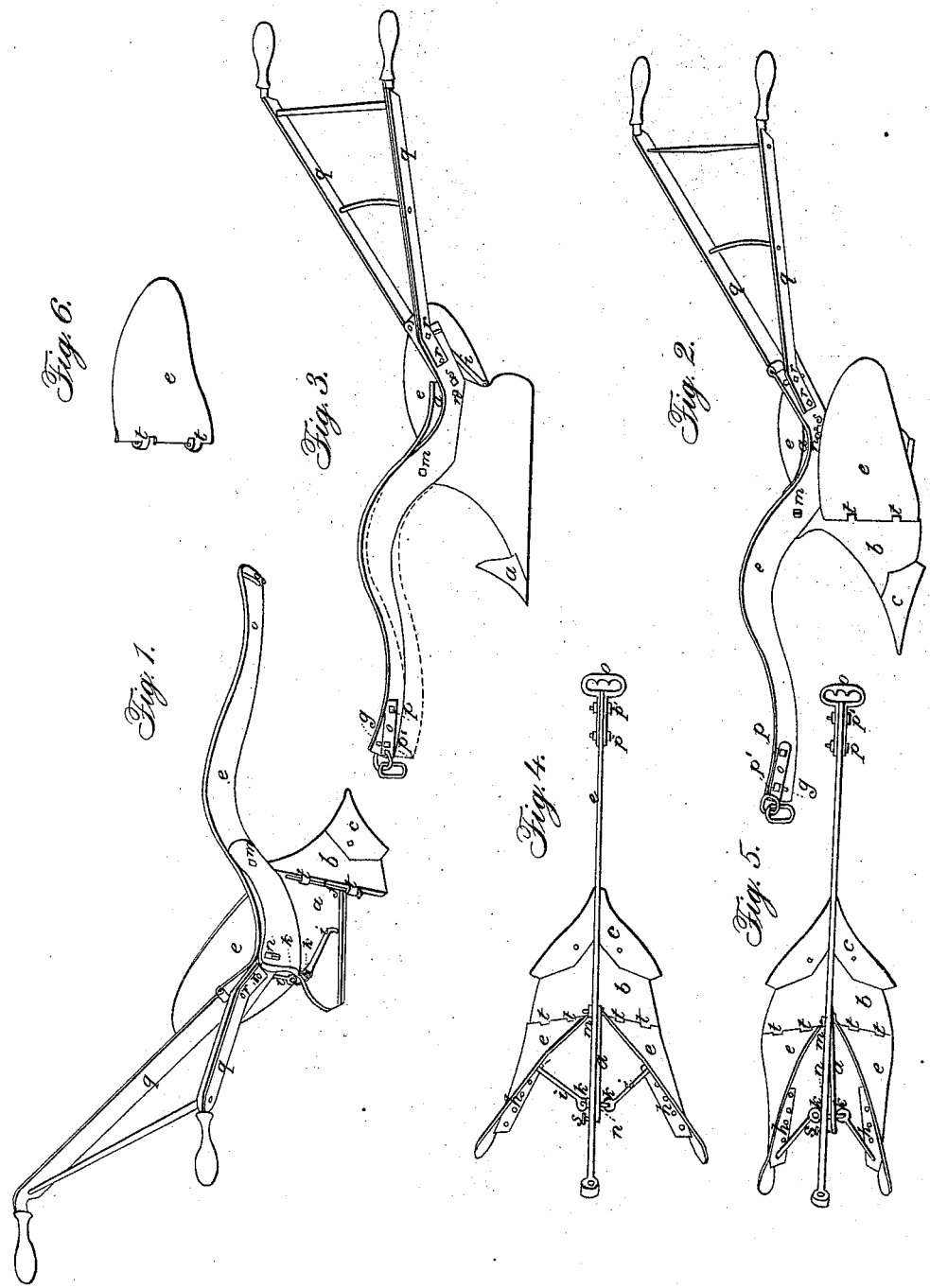
Witnesses:
W Barnode
R. A. Howard
Inventor:
John S Hall

UNITED STATES PATENT OFFICE.

JOHN S. HALL, OF MANCHESTER, PENNSYLVANIA.

IMPROVEMENT IN PLOWS.

Specification forming part of Letters Patent No. 10,505, dated February 7, 1854.

*To all whom it may concern:*

Be it known that I, JOHN S. HALL, of Manchester, in the county of Allegheny and State of Pennsylvania, have invented a new and useful Improvement in Plows; and I do hereby declare that the following is a full and exact description thereof, reference being had to the annexed drawings, forming part of this specification, wherein—

Figure 1 is a perspective view of my double plow with one of the mold-boards removed. Fig. 2 is a perspective view of my improved double plow. Fig. 3 is a similar view of a single plow constructed with my improvements. Fig. 4 is a vertical view of my double plow, the handles being removed and the mold-boards extended to their greatest width. Fig. 5 is a similar view to Fig. 4, excepting that the mold-boards are fixed at the smallest width. Fig. 6 is a view of one of my mold-boards.

My invention consists in fixing the mold-boards of either single or double plows on hinges, so as to be capable of being adjusted to any required width of furrow or crop to be cultivated; in so attaching the beam to the body of the plow by means of screw-bolts that the point of the beam can be raised or lowered at pleasure with great precision, so as to cut any required depth of furrow; in the manner of giving a nice lateral adjustment to the end of the beam by means of a set-screw, so as to regulate the angle of the plow with the line of draft in such a way as to give land to the plow or take it from it, and also in the mode of raising or lowering the points of draft of the plow without altering the position of the beam.

To enable others skilled in the art to make and use my improved plow, I will proceed to describe its construction and operation.

In the drawings, (in which the same letters refer to similar parts of my plow,) $a$ is the standard of the plow, which is cast in one piece with the body of the plow $b$, the share $c$ being removable as usual, and being of any desired shape.

The double plow (represented in all the figures excepting Nos. 3 and 6) has two mold-boards, $e\ e$, which are attached to the body of the plow by hinges $t\ t$, (shown more clearly in Figs. 1 and 6,) through which passes a bolt, $f$, to connect and unite the hinges, which is secured at top by a nut. Inside of each movable mold-board $e$ is a gage, $h$, cast in one piece with the mold-board, and perforated with as many holes as it will admit of, placed at uniform distance apart. These holes are to receive the hooked end of the rod $i$, the other end of which is attached to the standard by a loop, $k$, there being in a double plow two hooked rods, $i\ i$, one for each side of the standard $a$, to serve for its respective mold-board.

The single plow, Fig. 3, having only one mold-board, has of course but one hook and gage. By this arrangement the mold-boards can be extended laterally at pleasure or drawn in, and are firmly secured at the desired width by means of the hook $i$ fastening into one of the holes of the gage $h$ on each mold-board, or by any other suitable device for that purpose. The advantages of thus placing the mold-boards on hinges is that the mold-boards turn over the mold as far as the wings extend. Thus, when spread out, the double plow will serve to mold up corn or any other crop requiring wide culture, and if drawn in will serve to mold up the narrowest drills, and may be adjusted readily to any intermediate width, and in plowing the narrowest rows as well as the widest it will throw the dirt both ways to the required distance, thus doing the work of two plows.

The beam $l$ of my plow, which is made of iron, is of the shape shown in the drawings, and is attached to the standard $a$ by two screw-bolts, $m$ and $n$. The bolt $m$ is the center on which the beam $l$ turns when it is desired to raise or lower the end of the beam, and passes through corresponding circular holes in the standard and in the beam, and is secured, as usual, by a nut, by means of which it may be tightened or loosened. The bolt $n$ passes through a circular hole in the beam and through a segmental slot in the standard $a$ at the back end of it, near the top. The head of each of the bolts $m$ and $n$ is partially countersunk in the standard $a$, so that the bolts may remain firm while their nuts are being unscrewed. When the nut of the bolt $n$ is loosened the beam will turn on the center bolt, $m$, the bolt $n$ playing up and down in the segmental slot in the standard, thus raising or lowering the point of the beam $l$. In Fig. 2 the beam is represented as lowered, and in Fig. 3 it is represented as raised, the dotted lines showing its position when lowered.

The object of lowering and raising the beam is to cause the plow to cut a lighter or deeper furrow, as may be required. The same end may in a measure, at least, be attained by the bridle $o$ at the end of the beam. This is attached to the point of the beam $l$ by two screw-bolts, $p\ p'$, both bolts passing through circular holes in the bridle $o$, but the end bolt, $p'$, passing through a segmental slot, $g$, near the point of the beam, so that the hole may be raised, as shown in Fig. 2, or lowered, as shown in Fig. 3, at pleasure, and secured in its elevated or depressed position by the nuts on the screw-bolts $p\ p'$. This raises or lowers the point of draft and in a measure accomplishes the same end as elevating or depressing the beam, and may be used to increase the effect in case the beam will not rise or lower as much as is desired. The handles $q\ q$ are attached to the butt-end of the beam by screw-bolts $r\ r$, the handles also being capable of being raised or lowered at pleasure by an arrangement of one bolt working in a segmental slot, such as has just been described in the case of the bridle $o$.

It now only remains to describe the mode of adjusting the lateral motion of the beam in order to give "land" to the plow, as it is termed, or take the land from it.

Just back of the bolt $n$, in the side of the beam $l$, is a temper-screw, $s$, which works through a female screw cut in the beam, the end of the screw $s$ resting against the side of the standard $a$, near the upper hind corner. Now, if the bolts $m$ and $n$ be loosened and the screw $s$ screwed tight up, it is manifest that the standard $a$ and beam $l$ will be slightly separated, the beam being still kept at the same height by the screw-bolts $m$ and $n$ and the temper-screw $s$. The effect of separating the beam and standard at the back end of the standard and leaving them still united at the center bolt, $m$, (which is screwed up as tightly as the inclination of the beam will admit of,) is to throw the point of the beam over to one side, thus altering the line of draft of the plow and causing it to cut a wider furrow, the width of the furrow being determined by the variation of the beam from the line of the body and standard of the plow, the degree of such variation being regulated by the temper-screw, as before described.

Having described my improvement in plows, what I claim as my invention, and desire to secure by Letters Patent, is—

The hinges $i$, constructed in such a way that the edge of the front part of the mold-board may lap over the edge of the back part or wing of the mold-board to prevent clogging.

JOHN S. HALL.

Witnesses:
R. A. HOWARD,
ROBERT SMITH.